United States Patent
Shima

(10) Patent No.: US 7,362,457 B1
(45) Date of Patent: Apr. 22, 2008

(54) PRINTING SYSTEM AND PRINTER WHICH SENDS JOB REQUESTS FOR PRINTING

(75) Inventor: Toshihiro Shima, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/353,383

(22) Filed: Jul. 15, 1999

(30) Foreign Application Priority Data

Jul. 22, 1998 (JP) ................................ 10-206144

(51) Int. Cl.
*G06F 3/12* (2006.01)
*G06K 15/00* (2006.01)

(52) U.S. Cl. .................. 358/1.15; 358/1.16; 358/1.17; 358/1.18

(58) Field of Classification Search ........ 358/1.1–1.19; 709/201, 203, 205, 229, 213–219, 238; 725/112; 370/412, 413, 471, 474, 475; 399/1, 8; 347/1, 347/2, 3, 5
See application file for complete search history.

(56) References Cited

U.S. PATENT DOCUMENTS

| | | | | |
|---|---|---|---|---|
| 5,490,237 A | * | 2/1996 | Zimmerman et al. | ...... 358/1.16 |
| 5,999,707 A | * | 12/1999 | Taniguchi | ................... 358/1.15 |
| 6,075,616 A | * | 6/2000 | Nishi | .......................... 358/1.15 |
| 6,089,765 A | * | 7/2000 | Mori | ........................... 400/61 |
| 6,184,996 B1 | * | 2/2001 | Gase | ......................... 358/1.15 |
| 6,385,728 B1 | * | 5/2002 | Debry | ......................... 713/201 |

FOREIGN PATENT DOCUMENTS

| | | |
|---|---|---|
| EP | 0 598 513 A1 | 5/1994 |
| EP | 0 847 002 A1 | 6/1998 |
| JP | 63-288318 | 11/1988 |
| JP | 07-013721 | 1/1995 |
| JP | 07-200423 | 8/1995 |
| JP | 07-234830 | 9/1995 |
| JP | 09-212439 | 8/1997 |
| JP | 10-187377 | 7/1998 |

* cited by examiner

*Primary Examiner*—Dov Popovici
(74) *Attorney, Agent, or Firm*—Sughrue Mion, PLLC

(57) ABSTRACT

When a print job occurs, each host computer stores its job data on its own disk and sends job location data showing the location of the job data to a print server. The print server temporarily stores the job location data and sends it to a printer when the printer is ready. When the printer receives the job location data, it fetches job data from the host computer which the job location data shows and prints the job data.

5 Claims, 8 Drawing Sheets

PRINTING SYSTEM AND PRINTER WHICH SENDS JOB REQUESTS FOR PRINTING

BACKGROUND OF THE INVENTION

1. Field of the Invention

The present invention relates to a printer and a printing system for receiving a print job from a host computer and printing it.

The present application is based on Japanese Patent Application No. Hei. 10-206144, which is incorporated herein by reference.

2. Description of the Related Art

As for a conventional type printer, a host computer or a print server unilaterally sends a print job to a printer and the printer passively receives and processes it. FIG. 1 shows an example of connection in case a conventional type printer is used in network environment such as LAN. A printer 3, a print server 5 and host computers 7 and 9 are connected on a network 1. The host computers 7 and 9 send respective print job data 11, 13 to the print server 5 in steps S1 and S2. The print server 5 sequentially sends the job data 11, 13 to the printer 3 in S3 after the print server stores the job data in an auxiliary storage 5A such as a disk and queues it. The printer 3 processes the job data after it passively stores the job data from the print server 5 in a receive buffer memory 3A.

The print server 5 requires an auxiliary storage of very large capacity for storing job data. As the print server 5 is required in network environment, it costs. A printer also requires a receive buffer memory of large capacity for receiving job data. A printer always only prints under the initiative of a host computer and a print server and cannot spontaneously print (for example, cannot execute a print job set by a printer at time set by the printer).

SUMMARY OF THE INVENTION

Therefore, the object of the present invention is to enable a print server to dispense with an auxiliary storage of large capacity.

Another object of the present invention is to reduce the cost required for the installation of a print server.

Further another object of the present invention is to enable a printer to dispense with a receive buffer memory of large capacity.

The other object of the present invention is to enable a printer to spontaneously print.

In a printing system according to the present invention, when a print job occurs, a host computer does not generate its job data immediately and does not send it to a printer or a print server unilaterally but stores the job data in a storage inside the host computer or leaves the generation of job data until later. When the printer executes the print job, it demands its job data from the host computer. The host computer sends the stored job data to the printer or generates job data at that time and sends it to the printer in response to a job request.

In preferred embodiments, a host computer informs a print server of the location of job data and the print server temporarily stores the informed job location and sends it to a printer at suitable time. When the printer executes the job, it requests the host computer which the job location shows to send the job data.

When a printer demands job data from a host computer, it may also demand the whole job data, however, a printer may also demand only a part to be processed of job data.

A computer can typically function as a print server and a host, however, a computer program to realize the above can be installed in a computer or loaded into a computer via various media such as a disk storage, a semiconductor memory and a communication network.

Features and advantages of the invention will be evident from the following detailed description of the preferred embodiments described in conjunction with the attached drawings.

DETAILED DESCRIPTION OF THE PREFERRED EMBODIMENTS

Figure 1:
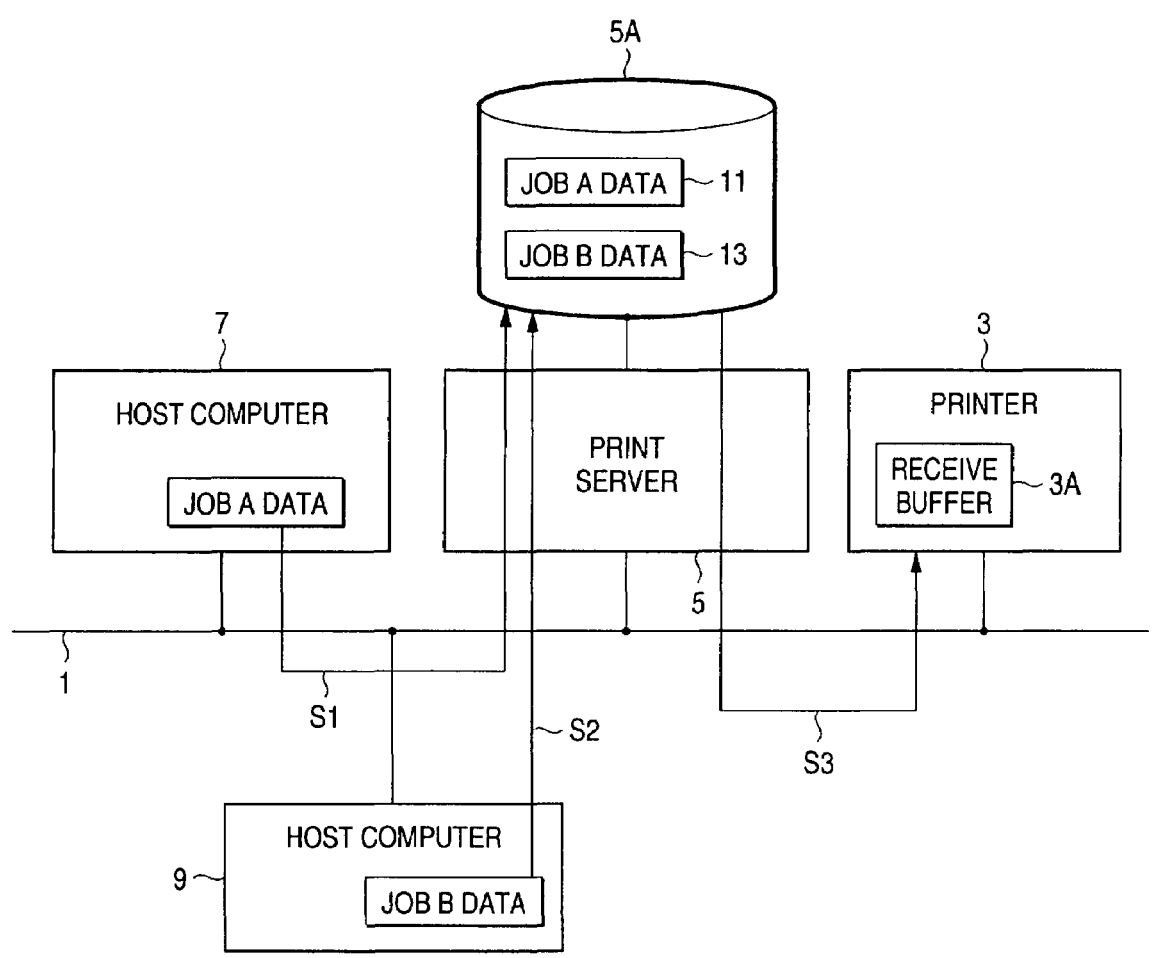
FIG. 1 is a block diagram showing an example of connection in case a conventional type printer is used in network environment.
Figure 2:
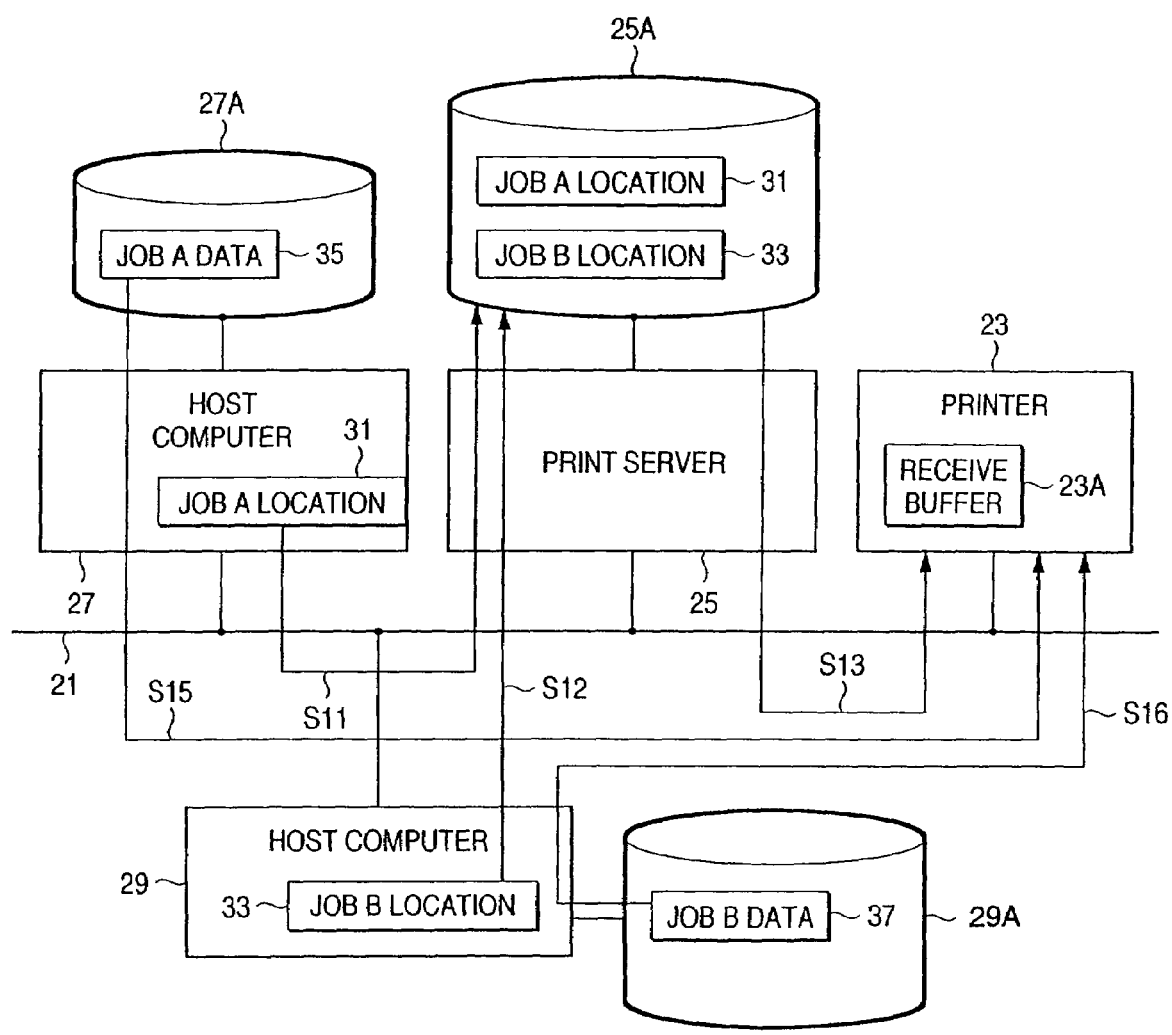
FIG. 2 is a block diagram showing connection in an embodiment of the present invention.

FIG. 2 shows the whole configuration and the outline of operation in an embodiment of the present invention.

A printer 23, a print server 25, host computers 27 and 29 are connected to a communication network 21 such as a local area network (LAN). When a printer driver in each host computer 27, 29 receives an instruction to print from a user, it generates print job data 35, 37, stores each job data 35, 37 in an auxiliary storage 27A, 29A which each host computer has such as a fixed disk and sends data 31, 33 showing the location of each job data 35, 37 such as the address in the network 21 of each host computer 27, 29, the local directory in the host computer 27, 29 of each job data 35, 37 and a set of the local directory and an identifier to the print server 25 in steps S11 and S12.

The print server 25 receives job location data 31, 33 from the host computers 27 and 29, temporarily stores the data in an auxiliary storage 25A such as a fixed disk, queues it an sequentially sends the job location data 31, 33 to the printer 23 in S13. The printer 23 stores the job location data 31, 33 sent from the print server 25 and sends a job request to the host computer 27 or 29 which stores its job data 35 or 37 using the job location data 31 or 33 of its print job when the printer executes each print job. The host computers 27 or 29 which receives the job request reads job data 35 or 37 which the job location data 31 or 33 shows from its own auxiliary storage 27A or 29A and sends the job data to the printer 23 in S15 or S16. The printer 23 temporarily stores the job data 35 or 37 in a receive buffer memory 23A, reads it from the receive buffer memory and executes printing processing.

The printer 23 can request each host computer 27, 29 to send only a specified part of job data 35, 37 in place of continuously sending the whole job data 35, 37 and in addition, can make a job request at desired time. Hereby, the printer 23 can process a print job according to a suitable schedule according to the situation of its own print engine and the receive buffer memory 23A.

Figure 3:
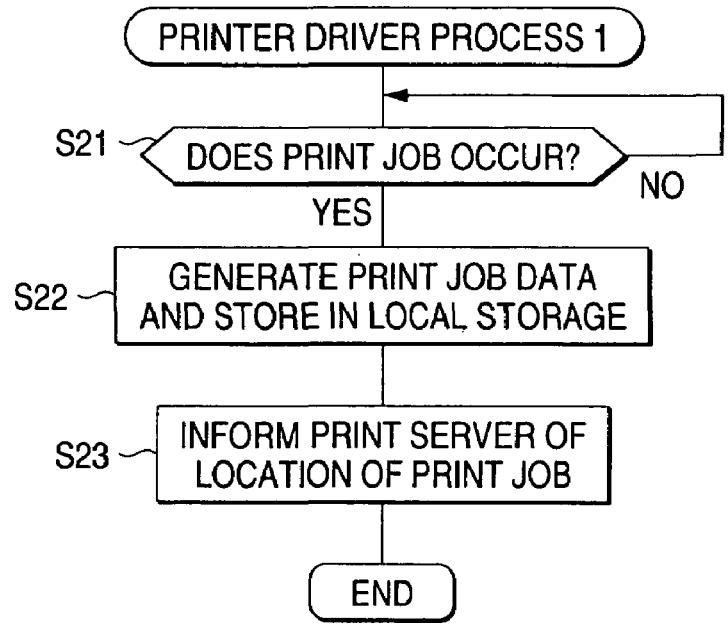
FIG. 3 is a flowchart showing the operation of the printer driver of host computers 27 and 29.
Figure 4:
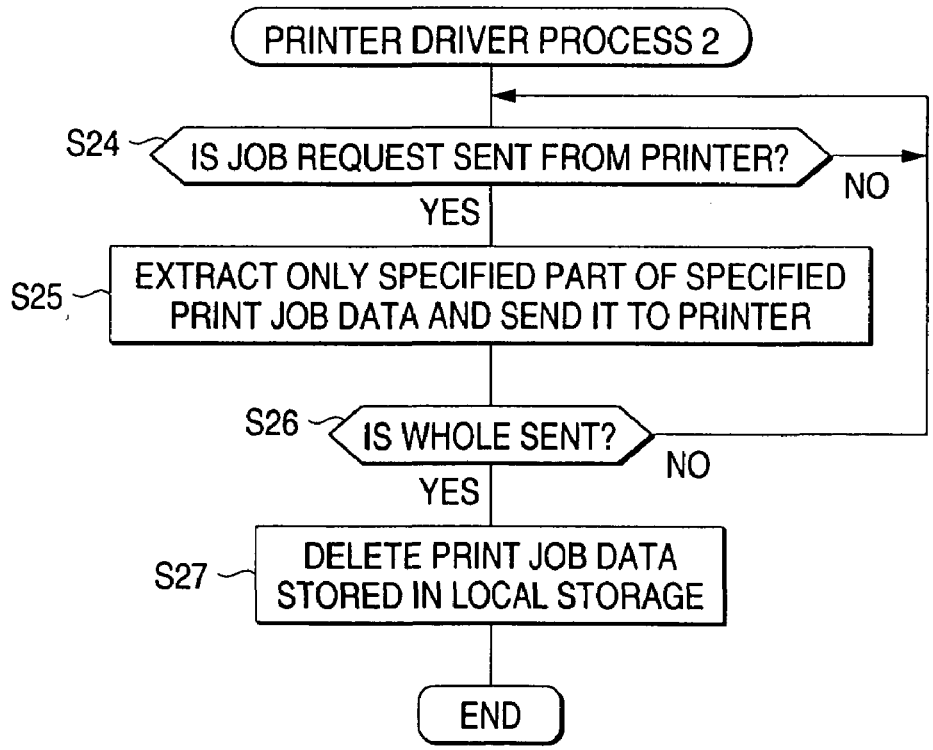
FIG. 4 is a flowchart showing the operation of the printer driver of the host computers 27 and 29.

FIGS. 3 and 4 show the operation of the printer driver of each host computer 27, 29.

As shown in FIG. 3, the printer driver of each host computer 27, 29 generates print job data which is a string of commands for instructing the printer 23 to execute a print job when the print job occurs in S21 by an instruction from a user and others and stores the print job data in a local directory of each host computer 27, 29 in S22. Next, the printer driver informs the print server 25 of the location of the print job data in S23.

When the printer driver of each host computer 27, 29 receives a job request from the printer 23 in S24 as shown in FIG. 4, it extracts a specified part of print job data specified by the job request referring to a directory and sends it to the printer 23 in S25. If the whole job data is specified in a job request, the whole is continuously sent, however, if only a part of a job is demanded in a job request, only the part is sent. When the whole print job data is sent to the printer 23 in S26, the printer driver deletes the stored print job data in S27.

As a transformed example, the processing in the step S22 shown in FIG. 3 may be also executed in a step S25 shown in FIG. 4. That is, when a print job occurs, only job location data such as an address in a network and a local job name may be also sent to the print server 25 without generating job data on the spot and afterward, when a job request is sent from the printer 23, job data may be also generated and sent to the printer 23. Print job data may be also deleted after the permission of deletion is sent from the printer 23 in place of deleting print job data in the step S27 immediately when sending the whole job data is finished.

Figure 5:
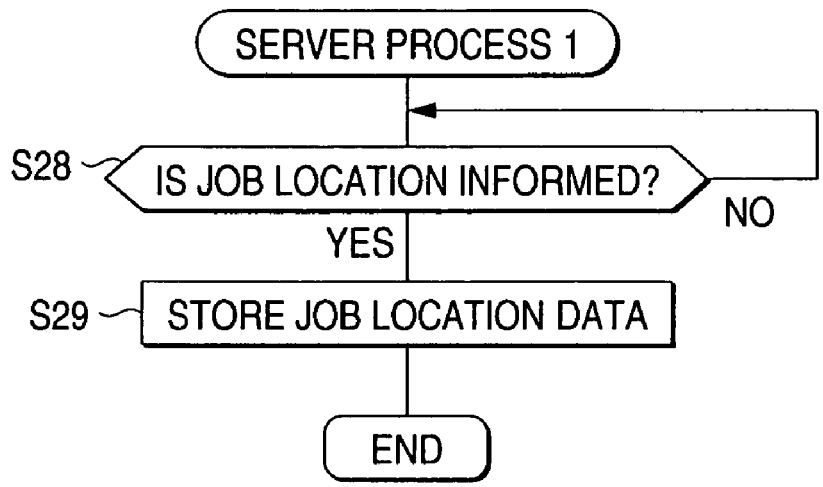
FIG. 5 is a flowchart showing the operation of a server.
Figure 6:
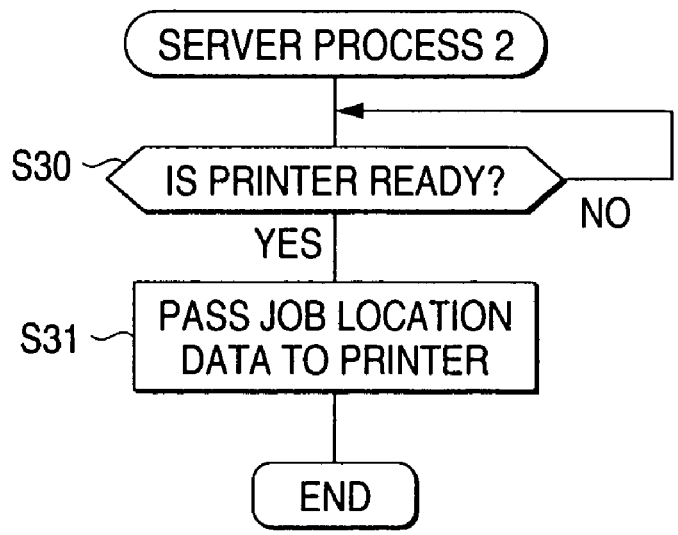
FIG. 6 is a flowchart showing the operation of the server.

FIGS. 5 and 6 show the operation of the print server 25.

As shown in FIG. 5, when the print server 25 is informed of the location of a print job from each host computer 27, 29 in S28, it queues data in the informed job location in S29. The print server 25 monitors the state of the printer 23 as shown in FIG. 6, sequentially extracts job location data in a queue and sends it to the printer 23 in S31 when the printer 23 is in a ready state in S30.

Figure 7:
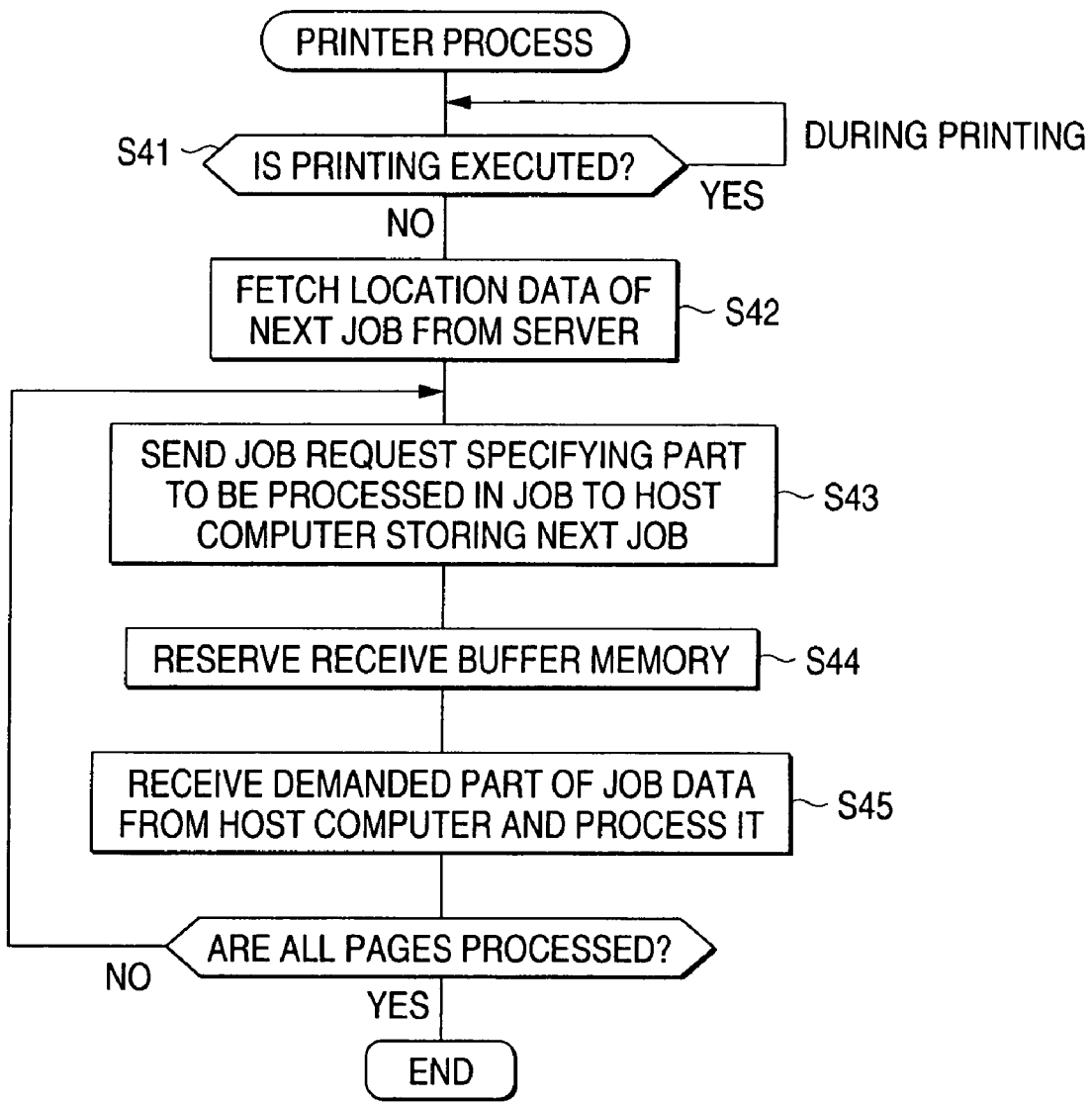
FIG. 7 is a flowchart showing the operation of a printer.

FIG. 7 shows the operation of the printer 23.

When the printing processing of the last job is finished in S41, the printer 23 fetches the job location data of the next job from the print server 25 in S42, specifies a part to be processed (may be also the whole) of job data to be processed for the host computer 27 or 29 having an address which the job location data shows and sends a job request in S43. The printer reserves the receive buffer memory 23A of capacity required for receiving the demanded part of job data in S44 and executes processing for storing the part of the job data sent from the host computer in the receive buffer memory 23A in S45. The steps S43 to S45 are repeated until the printing of the whole pages in the print job is finished. Permission that the job data may be deleted may be also sent to the host computer when the printing of the whole pages m is finished.

According to the above embodiment, as the print server 25 has only to store only the location of job data, the required capacity of its auxiliary storage is greatly reduced. As the printer 23 can adjust the quantity of received job data according to the situation of its print engine, the capacity of the job receive buffer which can be reserved and others, required memory capacity is reduced. Some examples in case the printer 23 demands not the whole job but only a part will be described below.

For example, in a first job request, only a header of job data is demanded, after the header is analyzed, a part required for the next processing, for example only a first page is demanded and after the first page is processed, the next part, for example only data on a second page is demanded. Hereby, the required capacity of the receive buffer is greatly reduced (if sufficient memory capacity is reserved, plural pages may be also demanded in each job request).

For example, if plural copies are printed, the same job data is demanded from the host computer again and a second copy is printed after the printing of the whole pages of a first copy is finished, the above processing is repeated every copy and the host computer is permitted to delete the job data after the printing of a final copy is finished. Hereby, it is not required to store the data of the whole pages in the printer and required memory capacity is reduced.

For example, in the case of double-sided printing, printing may be executed in the order of a second page, a fourth page, a first page, a third page, —and in such a case, the printer 23 demands only a page to be printed according to printing order as the second page in a first job request, the fourth page in the next request, the first page in the next request, the third page in the next request, —. Hereby, the printer 23 is not required to receive the data of a page slow in printing order earlier and store it.

For example, as one job data of the following job is very large and in addition, is linked inside (for example, according to PDF, data composing each page often exists in different locations in a file such as the data of a character font and an inserted image is linked to text data and in addition, font data linked to a first page exists in a final page in a file) if a large document such as an encyclopedia having a portable document format (PDF)(the trademark of Adobe Systems) is printed, it may be impossible that the printer 23 receives the whole job data together. In such a case, the printer 23 demands and receives a required part by required length in a file stored in the host computer such as only the text data of a fist page and the data of a font and an image respectively linked to the text data are demanded from the host computer when the first page is printed. Hereby, a print image can be generated using a receive buffer of small capacity.

For example, as for a home page of world wide web (WWW) server, an image file and others are often linked to a hyper text markup language (HTML) file in which home pages are described and the linked image file exists in another uniform resource locator (URL) different from the HTML file in the same host computer. If such a home page is printed, the printer 23 demands only data in a required file from the host computer such as the printer demands its HTML file and an image file linked to a first page from each URL when the first page of the home page is printed. Hereby, a print image can be generated using a receive buffer of small capacity.

Considering a case that the printer demands not the whole job but only a part from the host computer as described above, to facilitate partial specification, the printing system may be also composed so that the host computer informs the print server or the printer about the location (for example, where in a file, in which directory in the host computer or in which URL the data of each page is located) of each part composing a job when job location data shown in the step S23 in FIG. 3 is sent to the print server (or on a suitable occasion different from the above), and the printer demands a desired part based upon the information of the above location of each part from the host computer.

As shown in the above embodiment, the host computers 27 and 29 may also generate job data immediately when a print job occurs and store it, however, if job data is not generated until a job request is sent from the printer, waste that job data is stored in a storage for a long time can be saved.

The printer 23 can be also composed so that it can control printing time itself such as it fetches a specified print job from the host computer at specified time and processes it.

Figure 8:
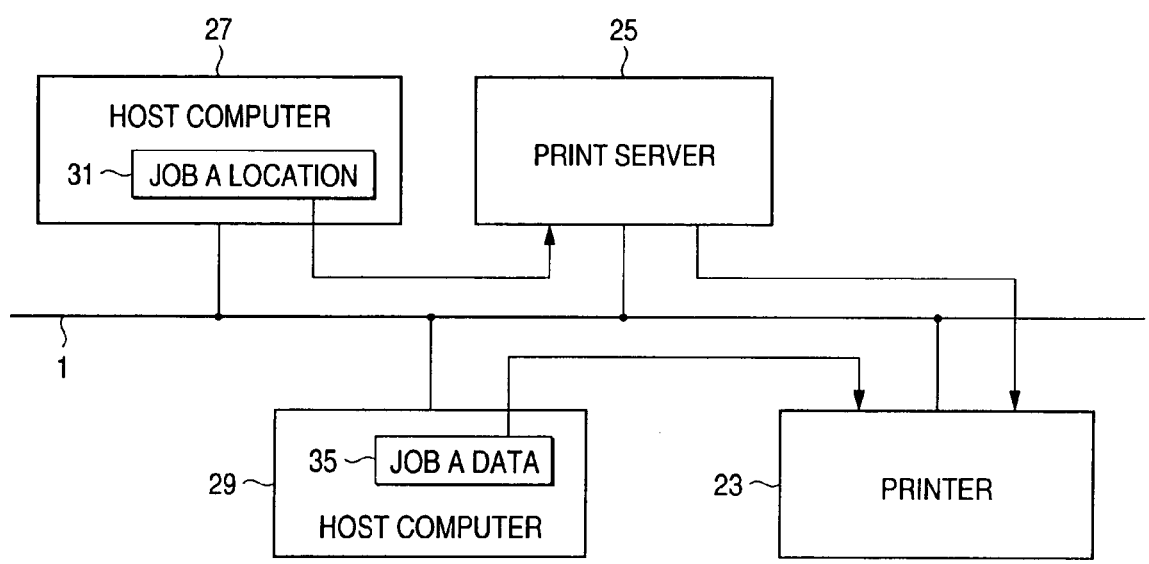
FIG. 8 is a block diagram showing a transformed example of the above embodiment.

As shown in FIG. 8, each role may be also fixed such as the host computer 27 informs the print server 25 of the location of a print job and the host computer 29 stores the job data 35 of the print job and supplies it to the printer 23.

Figure 9:
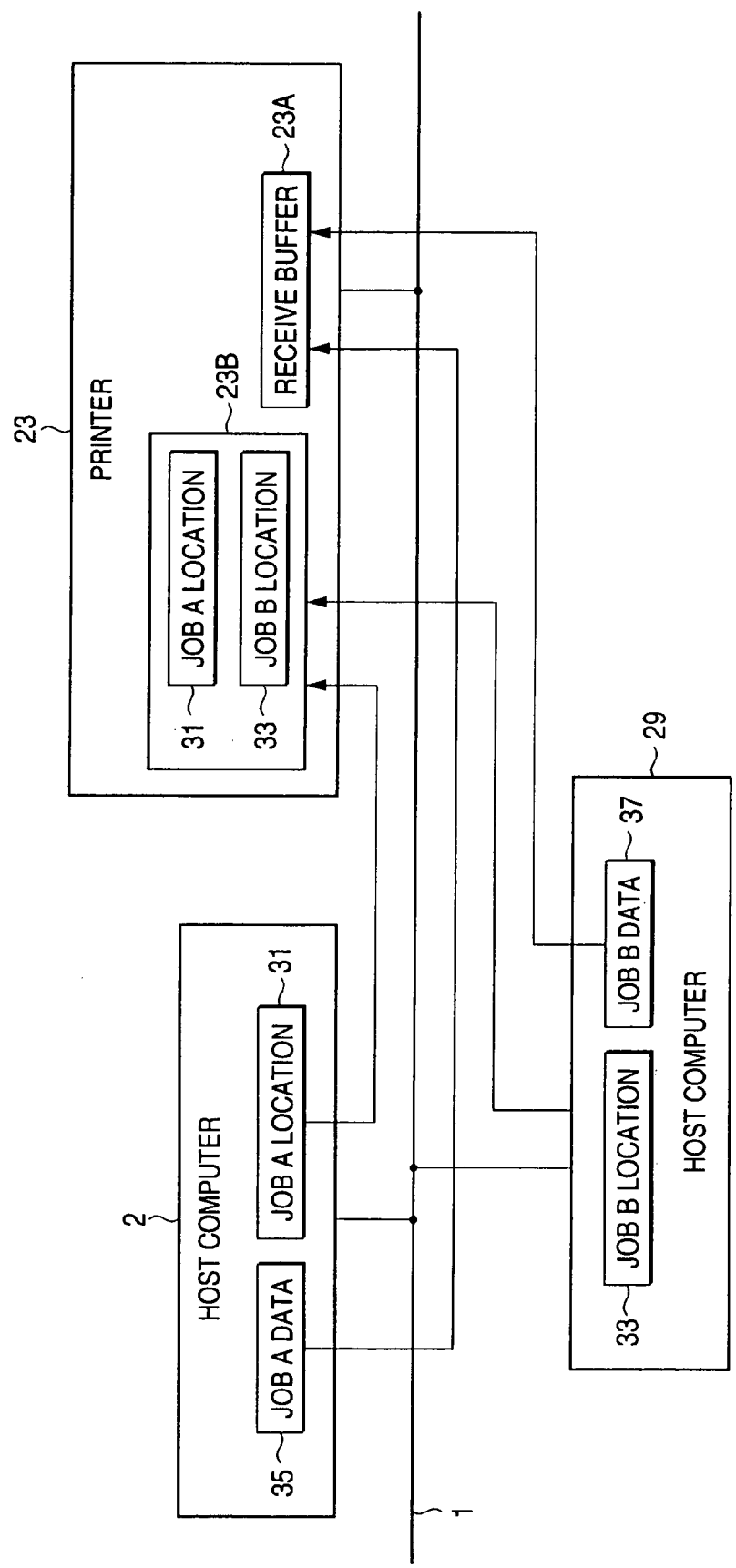
FIG. 9 is a block diagram showing another transformed example.

As storage capacity required for storing job location data is extremely small, the printer 23 may also function as a print server as shown in FIG. 9, may also directly receive job location data 31, 33 from each host computer 27, 29 and store the data in its own auxiliary storage 23B.

Figure 10:
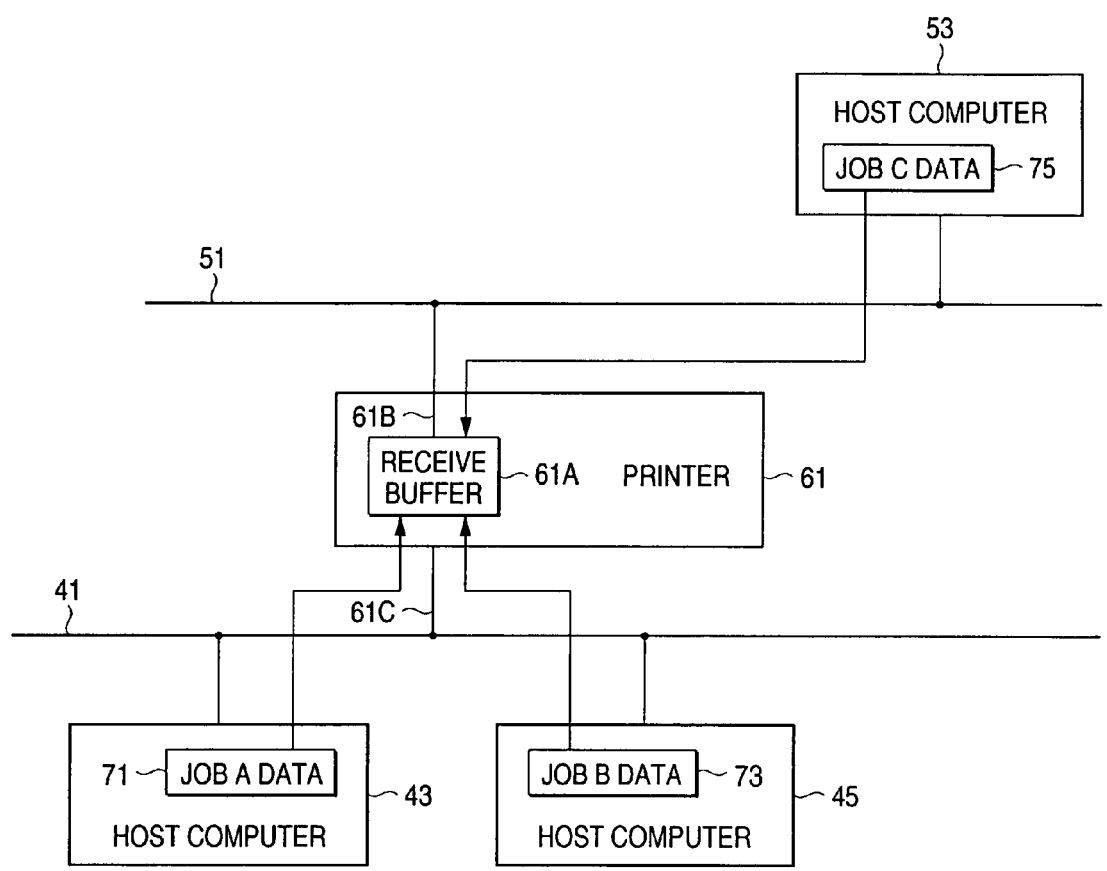
FIG. 10 is a block diagram showing a second embodiment.

FIG. 10 shows another embodiment of the present invention.

A printer 61 is provided with plural communication ports 61B and 61C and host computers 43, 45 and 53 are respectively connected to the ports 61B and 61C via communication networks 41 and 51 (the host computer may be also directly connected to the communication port via a dedicated cable). When a print job occurs in each host computer 43, 45, 53, each host computer temporarily stores the job data 71, 73, 75 of the print job in its own auxiliary storage and sends the job data to the printer 61 when a job request is sent from the printer 61. The printer 61 determines the processing schedule of the job, sends a job request to the host computer 43, 45 or 53 which stores one print job to be processed, fetches the print job data 71, 73 or 75 into a receive buffer 61A and fetches the next job data according to the similar procedure when the one print job is finished. Therefore, only one receive buffer 61A has only to be reserved. Incidentally, as a conventional type printer provided with plural ports secures plural receive buffers respectively corresponding to plural ports, the capacity of the receive buffer memory in the printer 61 shown in FIG. 10 can be reduced, compared with that in the conventional type printer.

For a method for the printer 61 to recognize the occurrence of a print job, each host computer 43, 45, 53 may also inform a print server or the printer every time a print job occurs as in the former embodiment and the printer 61 may also inquire of each host computer 43, 45, 53 as required.

The embodiments of the present invention are described above, however, these embodiments are examples for explaining the present invention and the present invention is not limited to only these embodiments. Therefore, the present invention may be also various embodiments other than the above embodiments.

What is claimed is:

1. A printer comprising:
   a job request section for sending a job request for demanding job data of a print job to a host computer;
   a printing section for receiving and printing said job data sent from said host computer in response to a print request from said job request section;
   a print engine; and
   a receive buffer memory,
   wherein said job request section sends said job request to said host computer, according to a condition of said print engine and said receive buffer memory,
   wherein said job request section receives job location data showing a location of said job data from a print server,
   wherein said job request section sends said job request to said host computer which said job location data shows,
   wherein said job request section can specify a part of said job data for said host computer when said job request section sends said job request,
   wherein said printing section receives only said specified part of said job data sent from said host computer in response to said print request from said job request section and prints it, and
   wherein said specified part of said job data comprises a portion of plural data forming a page of said print job.

2. A printer according to claim 1, wherein said print server receives said job location data showing the location of said job data from said host computer and temporarily stores it,
   wherein said job request section sends said job request to said host computer which said job location data stored in the print server shows.

3. A method of operating a printer, comprising steps of:
   demanding job data of a print job from a host computer having said job data; and
   receiving and printing said job data sent from said host computer in response to a job request of said demanding step,
   wherein said job request is sent to said host computer, according to a condition of a print engine and a receive buffer memory of said printer, and
   receiving job location data showing a location of said job data from a print server,
   wherein in said step of demanding, said job request is sent to said host computer which said job location data shows,
   wherein, in said step of demanding, a part of said job data can be specified for said host computer,
   in said step of printing, only said specified part of said job data sent from said host computer in response to said job request is received and printed, and
   wherein said specified part of said job data comprises a portion of plural data forming a page of said print job.

4. A method according to claim 3, wherein said received job location data showing the location of said job data from said host computer is temporarily stored,
   wherein, in said step of demanding, said job request is sent to said host computer which said stored job location data shows.

5. A method according to claim 3, further comprising a step of being informed of a location of each part constituting said job data from said host computer,
   wherein, in said step of demanding, said part of said job data can be specified for said host computer based upon said informed location of each part.

* * * * *